US008804839B2

(12) United States Patent
Park et al.

(10) Patent No.: US 8,804,839 B2
(45) Date of Patent: Aug. 12, 2014

(54) METHOD FOR IMAGE PREDICTION OF MULTI-VIEW VIDEO CODEC AND COMPUTER-READABLE RECORDING MEDIUM THEREOF

(75) Inventors: Ji Ho Park, Seoul (KR); Byeong Ho Choi, Yongin-si (KR); Je Woo Kim, Sungnam-si (KR); Yong Hwan Kim, Anyang-si (KR); Hwa Seon Shin, Seongnam-si (KR); Yo Sung Ho, Gwangju (KR)

(73) Assignee: Korea Electronics Technology Institute, Seongnam-si (KR)

( * ) Notice: Subject to any disclaimer, the term of this patent is extended or adjusted under 35 U.S.C. 154(b) by 1220 days.

(21) Appl. No.: 12/146,256

(22) Filed: Jun. 25, 2008

(65) Prior Publication Data

US 2009/0016436 A1 Jan. 15, 2009

Related U.S. Application Data

(60) Provisional application No. 60/946,525, filed on Jun. 27, 2007.

(51) Int. Cl.
*H04N 7/50* (2006.01)

(52) U.S. Cl.
USPC ............ 375/240.24; 375/240.12; 375/240.13; 375/240.25

(58) Field of Classification Search
USPC ........................... 375/240.12, 240.24, 240.13
See application file for complete search history.

(56) References Cited

U.S. PATENT DOCUMENTS 5,623,344 A * 4/1997 Lane et al. ..................... 386/314
5,805,762 A * 9/1998 Boyce et al. .................. 386/314
6,903,735 B2 6/2005 Jeong et al.
2006/0104354 A1 * 5/2006 Han et al. .................. 375/240.03
2007/0025631 A1 * 2/2007 Kim et al. ..................... 382/248
2008/0159638 A1 * 7/2008 Song et al. .................... 382/233
2009/0168874 A1 * 7/2009 Su et al. .................... 375/240.12

OTHER PUBLICATIONS

Koo, Han-Suh, "Motion Skip Mode for MVC", Joint Video Team (JVT) of ISO/IEC MPEG & ITU-T VCEG (ISO/IEC JTC1/SC29/WG11 and IYU-T SG16 Q.6) 21th Meeting: Hangzhou, China, Oct. 23-27, 2006.*
Yang, Haitao, et al., "Regional Disparity Based Motion and Disparity Prediction for MVC," ITU Study Group 16—Video Coding Experts Group—ISO/IEC MPEG & ITU-T VCEG (ISO/IEC JTC1/SC29/WG11 and ITU-T SG16 Q.6), Doc.JVT-V071, $22^{nd}$ Meeting: Marrakech, Morocco, Jan. 14, 2007.*

* cited by examiner

*Primary Examiner* — Un C Cho
*Assistant Examiner* — Siming Liu
(74) *Attorney, Agent, or Firm* — Sughrue Mion, PLLC

(57) ABSTRACT

In a method for image prediction of a multi-view video codec, a disparity vector value of a current macroblock is obtained and a corresponding macroblock is searched through the obtained disparity vector value. An intra prediction coding direction value of the searched macroblock is determined as an intra prediction coding direction value of the current macroblock. The current macroblock is coded/decoded through the determined intra prediction coding direction value. The coding efficiency can be increased by reducing a coding amount by omitting a process of obtaining an unnecessary disparity value by using a different-view intra prediction coding direction as a current-view intra prediction coding direction. The coding efficiency can be increased by reducing a coding amount by differentially coding a similar disparity vector. The reliability can be increased through an accurate disparity using multiples of 8 rather than 16, in motion skip for sharing the format of a macroblock.

6 Claims, 4 Drawing Sheets

METHOD FOR IMAGE PREDICTION OF MULTI-VIEW VIDEO CODEC AND COMPUTER-READABLE RECORDING MEDIUM THEREOF

CROSS-REFERENCE TO RELATED APPLICATIONS

This application claims priority under 35 U.S.C. §119(e) from U.S. Provisional Patent Application Ser. No. 60/946,525, filed Jun. 27, 2007, and entitled "Multi-View Coding," the entire contents of which are hereby incorporated by reference.

FIELD OF THE INVENTION

The present disclosure relates to multi-view video coding/decoding, and more particularly, to a method for image prediction of a multi-view video codec and a computer-readable recording medium thereof, which can increase a coding/decoding efficiency by using a different-view intra prediction coding direction as a current-view intra prediction coding direction.

BACKGROUND

In general, multi-view video coding (MVC) processes image sequences of respective views obtained from a plurality of cameras. The cameras are arranged so that there is a difference in distance and direction with respect to the same object. Multi-view images obtained through the cameras are different depending on the direction in terms of the degree of reflection of light at the surface of the same object, but the images of the respective views are highly correlated with each other. Due to the former characteristics of the multi-view images, there is a difference in brightness and chrominance between the images of respective views with respect to the same object, and thus the former characteristics must be considered in order to increase a coding efficiency of the multi-view video coding. Also, the coding efficiency of the multi-view images can be increased using the latter characteristics of the multi-view images.

In multi-view video coding that is being actively standardized, a method is investigated that increase the coding efficiency in consideration of the above two characteristics of the multi-view images on the basis of the conventional international standard for moving picture coding, H.264/MPEG-4 part Advanced Video Coding (hereinafter referred to as H.264/AVC). In the multi-view video coding that is being actively standardized, a method specified in the H.264/AVC is proposed for prediction of motion information such as a motion vector (MV). The MV prediction method specified in the H.264/AVC is based on the assumption that a motion vector MV of the current block obtained through temporal motion estimation (ME) is similar to a motion vector of a neighbor block.

That is, in the H.264/AVC, motion vectors $MV_N$ of neighbor blocks is used to obtain a motion vector predictor $MV_P$, and then a motion vector difference $MV_D$ is obtained by subtracting the motion vector predictor from the motion vector of the current block. Then, not the motion vector MV of the current block obtained through motion estimation, but the motion vector difference $MV_D$ is transferred to a decoder.

Also, in the H.264/AVC, if there are multiple neighbor blocks for the current block, an intermediate value of all or some of the motion vectors of the neighbor blocks and the obtained intermediate value is used as the motion vector predictor of the current block.

However, in the conventional multi-view codec (MVC), a value for each anchor slice is coded so that each GOP (Group of Picture) has one disparity value, the position is at an anchor slice header, and a non-anchor slice is derived from the previous anchor slice and the next anchor slice on a time axis from the corresponding anchor slice, which causes an unnecessary disparity value to be obtained.

Also, because disparities, i.e., displacements between images taken from different views are not identical but are similar, the coding amount can be minimized through the differential coding of the disparities. This, however, is not considered at all, and thus there is a limit in increasing the coding efficiency.

SUMMARY

Therefore, an object of the present invention is to provide a method for increasing a coding efficiency by reducing a coding amount by omitting a process of obtaining an unnecessary disparity value by using a different-view intra prediction coding direction as a current-view intra prediction coding direction.

Another object of the present invention is to provide a method for increasing a coding efficiency by reducing a coding amount by differentially coding a similar disparity vector.

A further object of the present invention is to provide a method for increasing reliability through an accurate disparity by using multiples of 8, not multiples of 16, in motion skip for sharing the format of a macroblock.

To achieve these and other advantages and in accordance with the purpose(s) of the present invention as embodied and broadly described herein, a method for image prediction of a multi-view video codec in accordance with an aspect of the present invention includes: obtaining a disparity vector value of a current macroblock and searching a corresponding macroblock through the obtained disparity vector value; determining an intra prediction coding direction value of the searched macroblock as an intra prediction coding direction value of the current macroblock; and coding/decoding the current macroblock through the determined intra prediction coding direction value.

The searching of the macroblock may include performing motion skip on a pixel-by-pixel basis within the range of the macroblock.

The performing of the motion skip may include multiplexing the set pixel unit value by a value coded on a syntax to provide an actual disparity value.

The performing of the motion skip may use a motion vector, a reference index, and a macroblock format corresponding to a position moved by the disparity value obtained at the current position in the motion skip.

The searching of the macroblock may be performed such that a disparity representative value for each view is present at any one of a sequence parameter set (SPS), a SPC MVC extension (SPS MVCE), a picture parameter set (PPS), and a PPS MVC extension (PPS MVCE).

The searching of the macroblock may be performed such that a difference between disparities of the current slice is present at a slice header of an anchor picture.

The searching of the macroblock may include differentially coding all disparity values on each time axis and each view.

The searching of the macroblock may be performed such that a difference between disparities of the current slice is present at a slice header of an anchor picture.

The searching of the macroblock may be performed such that if one picture is divided into multiple slices, each of the slices has a plurality of disparity values.

The searching of the macroblock may be performed such that each slice always has a disparity value regardless of the existence of an anchor picture.

To achieve these and other advantages and in accordance with the purpose(s) of the present invention, a computer-readable recording medium stores a program for executing a method for image prediction of a multi-view video codec in accordance with another aspect of the present invention, the method including: obtaining a disparity vector value of a current macroblock and searching a corresponding macroblock through the obtained disparity vector value; determining an intra prediction coding direction value of the searched macroblock as an intra prediction coding direction value of the current macroblock; and coding/decoding the current macroblock through the determined intra prediction coding direction value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
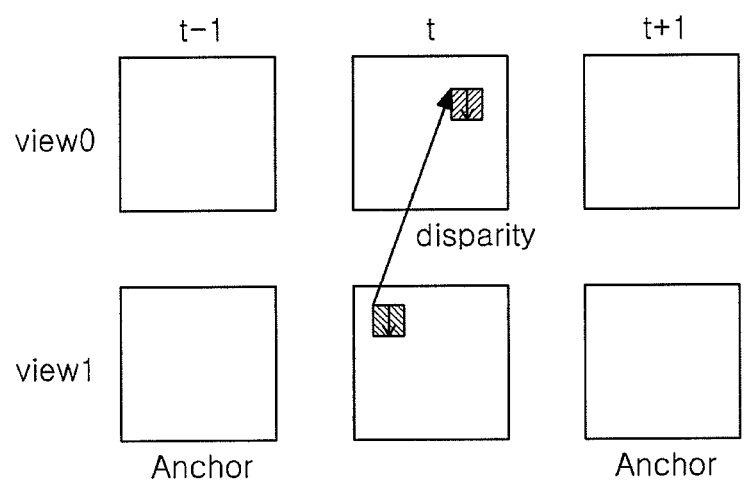
FIG. 1 is a flow diagram illustrating an image prediction process of a multi-view video codec according to an embodiment of the present invention.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals in the drawings denote like elements, and thus their description will be omitted for conciseness.

A multi-view codec according to the present invention can perform prediction by using images of different views, in addition to a technique used in a conventional two-dimensional codec. The most import fact considered in such a technique is how the closest image of a current-view image is obtained using images of different views.

To this end, a macroblock corresponding to a current macroblock must be first detected in case of using precoded motion information of different views. The present invention is intended to provide a method for increasing a coding efficiency by reducing a coding amount by differentially coding a disparity vector, which is used as information for detecting the corresponding macroblock, and by omitting a process of obtaining an unnecessary disparity value by using a different-view intra prediction coding direction as a current-view intra prediction coding direction.

Also, the present invention can be implemented by using a program readable by a computer or an equivalent digital device or by using a recording medium storing the program. That is, the present invention can be implemented by using a computer or an equivalent digital device that operates a program for executing a method for image prediction of a multi-view video codec according to the present invention. The following description will be made on the assumption that a control means (hereinafter referred to as a controller) of an operation unit performs an operation of the method according to the present invention.

Figure 2A:
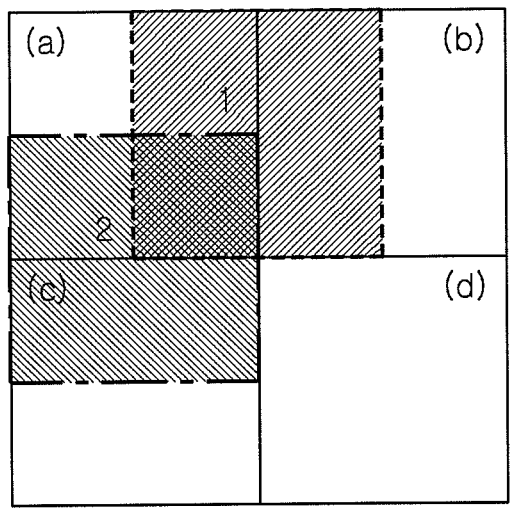
FIGS. 2A and 2B are diagrams illustrating a process for obtaining a disparity vector of a macroblock according to an embodiment of the present invention.
Figure 2B:
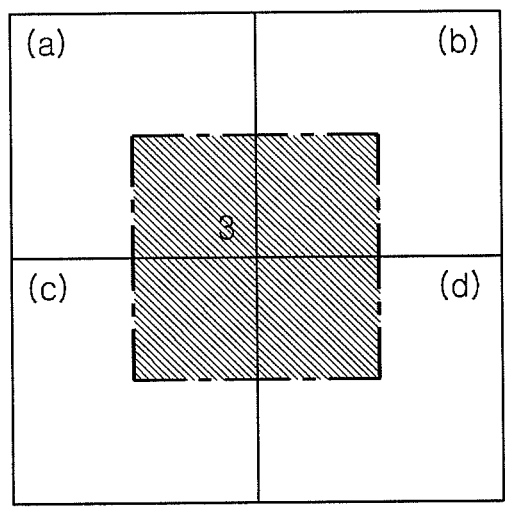

FIG. 1 is a flow diagram illustrating an image prediction process of a multi-view video codec according to an embodiment of the present invention. FIGS. 2A and 2B are diagrams illustrating a process for obtaining a disparity vector of a macroblock according to an embodiment of the present invention.

Referring to FIG. 1, in operation S100 and S200, after a disparity vector value of a current macroblock is obtained, the obtained disparity vector value is used to perform searching a corresponding macroblock. The following operations are performed to obtain a disparity vector value that is used as information for searching a macroblock corresponding to a current macroblock to be coded.

For a general disparity, set pixels are taken in multiples of 16. However, for an accurate disparity vector value, the embodiment of the present invention uses set pixels in multiples of 8. In this case, if a value coded on a syntax is '1', 8 is multiplied so that an actual disparity value is 8.

At this point, a motion vector, a reference index, and a macroblock format corresponding to a position moved by the disparity value (e.g., 8) obtained at the current position, are used as they are. The reason for this is that, as illustrated in FIG. 2A, if a disparity value corresponds to the position of a macroblock 1, the macroblock 1 ranges across the portions of macroblocks a and b and thus a macroblock format is derived from macroblock formats a and b. That is, if both the macroblocks are skipped, the macroblock is skipped; if both the macroblocks have a value of below 16×16, the macroblock has a value of 16×16; if both the macroblocks have a value of below 8×16, the macroblock has a value of 8×16; and if the macroblock does not belong to any of both the macroblocks, it has a value of 8×8. Also, if a disparity value corresponds to the position of a macroblock 2, a macroblock format is derived in the same manner as above, with the exception of not 8×16 but 16×8.

If a disparity value is aligned with a macroblock, information of the corresponding macroblock is used as it is. That is, as illustrated in FIG. 2B, if a disparity value corresponds to the position of a macroblock 3, the macroblock 3 ranges across the portions of macroblocks a, b, c and d. Thus, if four macroblocks are identical in terms of reference index and motion vector, a macroblock format becomes 16×16; if a=c and b=d, a macroblock format becomes 8×16; if a=b and c=d, a macroblock format becomes 16×8; and if all the macroblocks are different, a macroblock format becomes 8×8.

Also, in a general multi-view codec (MVC), a value for each anchor slice is coded so that each GOP (Group of Picture) has one disparity value, the position is at an anchor slice header, and a non-anchor slice is derived from the previous anchor slice and the next anchor slice on a time axis from the corresponding slice. However, using the fact that a disparity is the displacement between images taken from different views and thus they have a similarity therebetween, the embodiment of the present invention reduces the coding amount through the differential coding of the disparity.

That is, a disparity representative value for each view is present at any one of a sequence parameter set (SPS), a SPC MVC extension (SPS MVCE), a picture parameter set (PPS), and a PPS MVC extension (PPS MVCE). A difference between disparities of the current slice is present at a slice header of an anchor picture, or the representative value is written for only one view, and the remaining values have only a difference, so that each slice uses the disparity representative value minus the difference between the disparities of the current slice as an actual disparity value.

Figure 3:
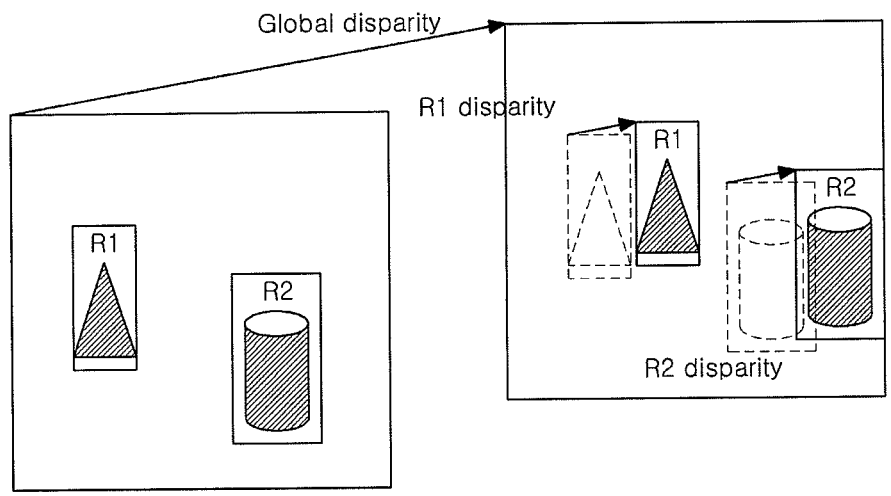
FIG. 3 is a diagram illustrating that there are different disparities for one picture according to an embodiment of the present invention.

Also, if one picture is divided into multiple slices, each picture does not have only one disparity but each slice has a plurality of disparity values, so that a global disparity can be used as a regional disparity. As illustrated in FIG. 3, if a global disparity value is present in the background, and if each of regions R1 and R2 has a region disparity value, the disparity of the entire picture is selected as the representative value, and the regions R1 and R2 and the background are constituted by the respective slices, so that there are different disparities in one picture, or so that each slice always has a disparity value regardless of the existence of an anchor picture, thus providing a more accurate disparity value. At this point, differential coding is also used to minimize the amount of information, the first slice constituting the picture has an overall disparity representative value, and slices with different disparities are differentially coded.

Thereafter, in operation S300, an intra prediction coding direction value of the searched macroblock is determined as an intra prediction coding direction value of the current macroblock. The international standard, H.264/MPEG-4 part Advanced Video Coding (hereinafter referred to as H.264/AVC), specifies 9-direction intra prediction coding direction values. This direction value is represented by flag information for informing the accordance of direction with the immediately previous macroblock. If the direction is not accorded, the direction value is represented by a value for informing in which of eight directions except the direction used in the previous macroblock the coding was performed. Thus, if the H.264/AVC is used as it is, only one image input from one camera (view) is coded and decoded and thus usable information is limitative. However, the embodiment of the present invention codes multiple views and thus uses information, which has already been coded at a different view, for the current view as it is.

Figure 4:
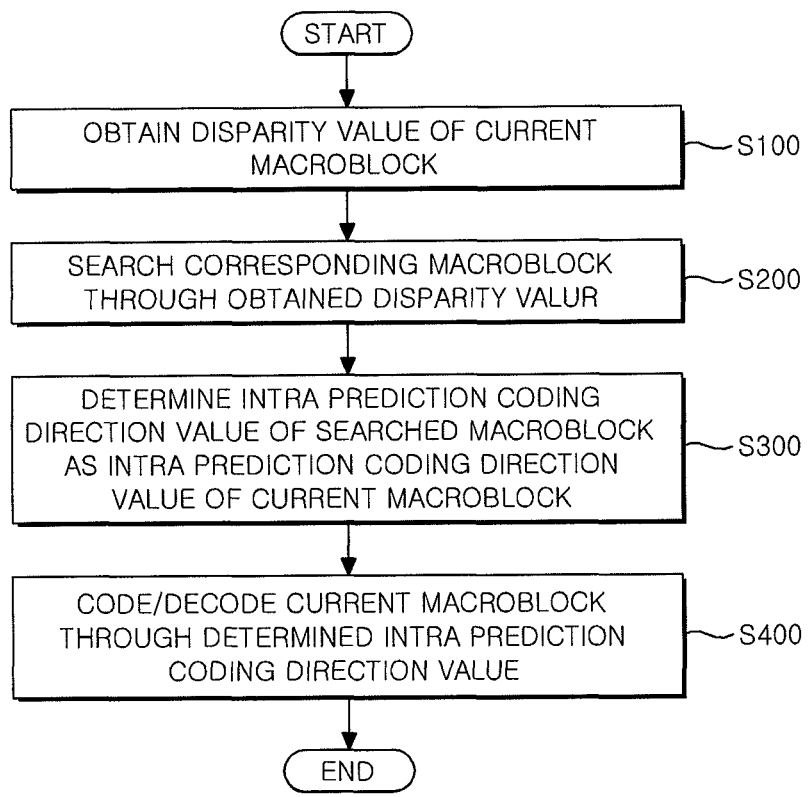
FIG. 4 is a diagram illustrating a process for determining an intra prediction coding direction according to an embodiment of the present invention.

That is, the intra prediction coding direction of the corresponding macroblock searched through the obtained disparity value is used as the prediction coding direction of the current macroblock. For example, as illustrated in FIG. 4, when a corresponding macroblock 200 is searched through a disparity, the intra prediction coding direction of the corresponding macroblock (view0) is used as the prediction coding direction of the current macroblock (view1) to be coded. In this case, information indicating that the current macroblock (view1) used the intra prediction decoding direction of the corresponding macroblock view0 is necessary, which is informed through the flag information. This flag information uses 1 bit and is present at any one of a slice header of the current slice, a slice header extension, slice data, and a slice data extension.

Thereafter, in operation S400, the current macroblock is coded and decoded through the intra prediction coding direction value determined in operation S300.

Although only the case of coding has been described in the above embodiment, the present invention is also applicable to the case of decoding. In the case of decoding, information indicating that the corresponding technique was used is received in a bit stream, the disparity and the intra prediction coding direction value are used to fetch the corresponding target macroblock, and addition and subtraction are performed to obtain a restored image, a detailed description of which will be omitted for simplicity.

The above-described method of the present invention can be realized as a program and stored in a computer-readable recording medium that can execute the program. Examples of the computer-readable recording medium include CD-ROMs, RAMs, ROMs, floppy disks, hard disks, magneto-optical disks, and flash memories.

As described above, according to the method for image prediction of a multi-view video codec and the computer-readable recording medium thereof, the coding efficiency can be increased by reducing a coding amount by omitting a process of obtaining an unnecessary disparity value by using a different-view intra prediction coding direction as a current-view intra prediction coding direction.

Also, according to the method for image prediction of a multi-view video codec and the computer-readable recording medium thereof, the coding efficiency can be increased by reducing a coding amount by differentially coding a similar disparity vector.

Also, according to the method for image prediction of a multi-view video codec and the computer-readable recording medium thereof, the reliability can be increased through an accurate disparity by using multiples of 8, not multiples of 16, in motion skip for sharing the format of a macroblock.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for image prediction of a multi-view video codec, comprising:
    obtaining information about a representative disparity of a first view picture comprising a plurality of slices with respect to a second view picture comprising a plurality of slices;
    obtaining information about two or more regional disparities of two or more slices of the first view picture with respect to two or more slices of the second view picture; and
    coding or decoding the first view picture using the information about the representative disparity and the two or more regional disparities,
    wherein the coding or decoding the first view picture comprises differential coding or decoding, respectively, in which differences between the representative disparity and disparities of the other slices in the first view picture are used.

2. The method of claim 1, wherein the representative disparity of the first view picture is present at any one of a sequence parameter set (SPS), a SPS multi-view video codec (MVC) extension (SPS MVCE), a picture parameter set (PPS), and a PPS MVC extension (PPS MVCE).

3. The method of claim 1, wherein the representative disparity is a disparity of a first slice in the first view picture with respect to a corresponding slice in the second view picture.

4. The method of claim 1, wherein each of the first and second view pictures comprises a plurality of slices, and each of the plurality of slices has at least one disparity.

5. The method of claim 4, wherein the representative disparity is a disparity of a first slice in the first view picture with respect to a corresponding slice in the second view picture.

6. The method of claim 1, wherein each of the first and second view pictures comprises a plurality of slices, and each slice has at least one disparity regardless of existence of an anchor picture.

\* \* \* \* \*